UNITED STATES PATENT OFFICE.

MAX GÜTTNER, OF BRESLAU, GERMANY.

PROCESS OF PREPARING SOLDER.

SPECIFICATION forming part of Letters Patent No. 500,125, dated June 27, 1893.

Application filed February 3, 1893. Serial No. 460,831. (No specimens.)

*To all whom it may concern:*

Be it known that I, MAX GÜTTNER, a subject of the Emperor of Germany, and a resident of Breslau, Germany, have invented a Process of Preparing Solder Suitable for Aluminium and other Metals, of which the following is a specification.

Heretofore it has been found that ordinary solders such as tin or alloys thereof with lead or with zinc and lead are useless when applied to soldering aluminium to itself or to other metals since aluminium will not make a firm junction with such solder. It has therefore been presumed that ordinary solders are inapplicable.

The object of the present invention is to prepare a solder of the ordinary kind which, while useful for all ordinary purposes of soldering can also be used for efficiently soldering aluminium to itself or to other metals. For this purpose I take ordinary solder, whether tin, or alloy of tin and lead, with or without zinc and melt the same; or I make the solder by melting together the ingredients and while they are still molten in either case I add any oxidizing material such as any of the following substances namely nitrate of potash, of soda, or of ammonia, chloride of lead or of soda, chlorate of potash, hydrate of soda, or nitrate or sulphate of lead the object of which addition is to oxidize or chemically cleanse the solder, the amount to be added being about one tablespoonful for each ten or eleven pounds of the solder. The added substance or substances is or are stirred with the molten metal and the scum rising to the surface is skimmed off and removed from time to time until no further, or but very slight further scumming is observed. The operation should be repeated several times. The resulting solder is clean and thin flowing and has proved to be so efficacious in the soldering of aluminium that the joint is stronger than the aluminium itself.

I have found that solder contains among its impurities, as do tin and lead, small but very disturbing quantities of arsenic and antimony and that the above process removes these or renders them harmless as regards the soldering power of the metal for aluminium, and although oxidizing materials have been used to refine lead, no such process has been used for tin much less for solder. Nor has the harmfulness of the above noted impurities in soldering ever been before noticed.

A specially good solder is made of equal parts of tin and lead treated as above described.

I claim as my invention—

A method of preparing solder, consisting in adding to the molten tin or alloy of tin and lead an oxidizing substance and removing the scum, and repeating this operation several times prior to casting the solder in suitable molds.

In testimony whereof I have signed this specification in the presence of two subscribing witnesses.

MAX GÜTTNER.

Witnesses:
A. B. BEŸRENTHER,
LUDWIG OLIVERY.